(No Model.)

K. W. VOGEL.
FILTERING APPARATUS.

No. 316,925. Patented Apr. 28, 1885.

WITNESSES:
Jos. W. Rosenbaum.
Martin Petry

INVENTOR
Karl Wilhelm Vogel
BY
Goepel & Raegener
ATTORNEYS.

N. PETERS, Photo-Lithographer, Washington, D. C.

UNITED STATES PATENT OFFICE.

KARL WILHELM VOGEL, OF NEW YORK, N. Y.

FILTERING APPARATUS.

SPECIFICATION forming part of Letters Patent No. 316,925, dated April 28, 1885.

Application filed August 14, 1884. (No model.)

*To all whom it may concern:*

Be it known that I, KARL WILHELM VOGEL, of the city, county, and State of New York, have invented certain new and useful Improvements in Filtering Apparatus, of which the following is a specification.

This invention relates to an improved filtering apparatus for water and other liquids, which is so constructed that the apparatus can be used without interruption for filtering purposes; and the invention consists of a filtering apparatus consisting of two separate filtering-chambers, and connected by valved branch pipes with the supply and discharge pipes, so that either filtering-chamber can be used. The filter is tightly supported in its inclosing chamber or shell, and composed of two layers of wire-gauze and an intermediate layer of suitable fibrous material.

Figure 1:
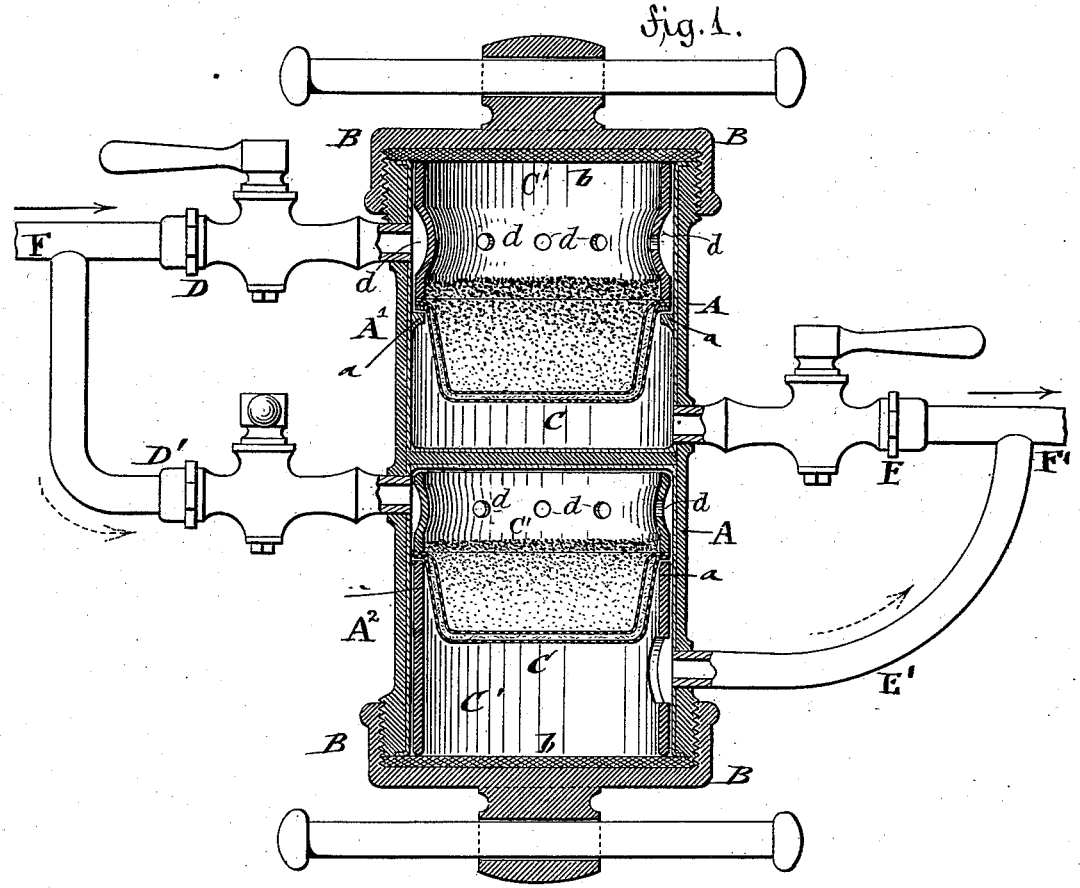
Figure 2:
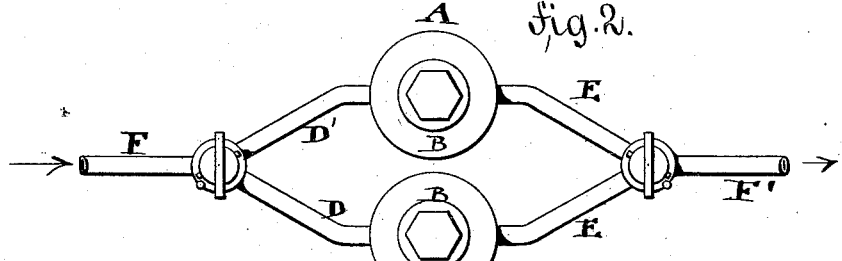
Figure 3:
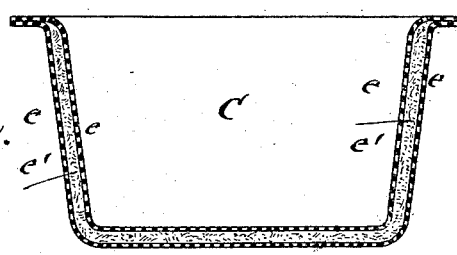

In the accompanying drawings, Figure 1 represents a vertical central section of my improved filtering apparatus. Fig. 2 is a plan of a modified form of the same. Fig. 3 is a detail section of the filter, drawn on a larger scale.

Similar letters of reference indicate corresponding parts.

A in the drawings represents the casing of my improved filter. The casing A is closed tightly at each end by a detachable screw-cap, B, provided with suitable packing, $b$. Two filtering-chambers, $A' A^2$, are arranged, either one below the other or sidewise of each other, as shown, respectively, in Figs. 1 and 2. The chambers $A' A^2$ are connected by valved branch pipes, D D' and E E', respectively, with the supply-pipe F and discharge-pipe F'. A filter, C, is supported at the inside of each chamber on a shoulder, $a$, and retained in position by a cylindrical collar, C', having an annular depression forming a middle bulged or concaved portion, provided with openings $d\ d$ for the admission of the liquid to be filtered. When the filtering-chambers are arranged one below the other, both branch supply-pipes are provided with valves and stop-cocks, also the branch discharge-pipe E. When the filtering-chambers are arranged sidewise of each other, the supply and discharge pipes F F' are connected with the branch pipes D D' and E E' by three-way cocks at the points of junction of said pipes, as shown in Fig. 2, so that the liquid to be filtered may be passed through either one of said filtering-chambers $A' A^2$.

The filter C proper is made basket-shaped, of two or more layers, $e\ e$, of wire-gauze of suitable mesh, and an intermediate layer, $e'$, of compressed cotton or other suitable fibrous material, as shown clearly in Fig. 3. This filter retains not only the larger impurities, but also the finer impurities contained in the liquid, while the dissolved impurities are retained by a filling of charcoal placed into the cup or basket shaped filters C. The branch supply-pipes D D' open into the chambers $A' A^2$ above the filters C, at that part where the cylindrical portion of the collar C' is made concave and provided with openings, so that the liquid is spread in the annular space between the casing A and the cylindrical portion C', whereby the sudden impact and stirring up of the pulverized charcoal is prevented, and an even flow of the liquid through the filter secured. The discharge-pipes E E' are arranged below the bottom of the filters C.

When it is desired to clean or replace one of the filters, the valves of the supply and discharge pipes of one chamber, $A^2$, are closed, and those of the other filtering-chamber, A', opened, so that the liquid is conveyed in a continuous current through the second filter, which is used either alternately with the first filter or as an auxiliary thereto, as desired.

My improved filtering apparatus can be used, when constructed on a smaller scale, in connection with the water-supply pipe of a building for filtering the water used for consumption, or on a larger scale for filtering larger quantities of water, beer, or other liquids.

Having thus described my invention, I claim as new and desire to secure by Letters Patent—

1. The combination of a cylindrical casing, a filter within said casing, an inner cylinder fitted within said casing above said filter, and provided with an annular perforated inward bulge above said filter, an induction-pipe connected to the outer casing, opposite the bulge of the inner cylinder, and an eduction-pipe below said filter, substantially as described.

2. The combination, in a filter, of a cylindrical casing, a perforated pan within said casing containing filtering material, an inner cylinder fitted within said casing above said pan, and provided with an annular perforated inward bulge above said filtering material, an induction-pipe connected to the outer casing opposite the bulge of the inner cylinder, and an eduction-pipe below said pan, substantially as described.

In testimony that I claim the foregoing as my invention I have signed my name in presence of two subscribing witnesses.

KARL WILHELM VOGEL.

Witnesses:
PAUL GOEPEL,
SIDNEY MANN.